(12) United States Patent
Kitaura et al.

(10) Patent No.: US 9,802,206 B2
(45) Date of Patent: Oct. 31, 2017

(54) METHOD FOR PRODUCING GRAPHENE

(71) Applicant: Panasonic Intellectual Property Management Co., Ltd., Osaka (JP)

(72) Inventors: Hidetoshi Kitaura, Osaka (JP); Naomi Nishiki, Kyoto (JP); Kazuhiro Nishikawa, Osaka (JP); Kimiaki Nakaya, Osaka (JP); Atsushi Tanaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 449 days.

(21) Appl. No.: 14/401,533

(22) PCT Filed: May 24, 2013

(86) PCT No.: PCT/JP2013/003299
§ 371 (c)(1),
(2) Date: Nov. 17, 2014

(87) PCT Pub. No.: WO2013/179622
PCT Pub. Date: May 12, 2013

(65) Prior Publication Data
US 2015/0136881 A1    May 21, 2015

(30) Foreign Application Priority Data
May 30, 2012    (JP) .................. 2012-122723

(51) Int. Cl.
*B02C 23/00* (2006.01)
*B03C 1/30* (2006.01)
(Continued)

(52) U.S. Cl.
CPC ............... *B03C 1/30* (2013.01); *B02C 19/06* (2013.01); *B02C 23/08* (2013.01); *B82Y 30/00* (2013.01);
(Continued)

(58) Field of Classification Search
CPC ........... B02C 19/06; B02C 23/08; B03C 1/30; B82Y 30/00; C01B 31/04
(Continued)

(56) References Cited

U.S. PATENT DOCUMENTS 6,824,086 B1 * 11/2004 Mazurkiewicz ........ B02C 19/06
  241/152.2
8,672,246 B2 * 3/2014 Lee ........................ B82Y 30/00
  241/21

(Continued)

FOREIGN PATENT DOCUMENTS

| CN | 101439853 | 5/2009 |
|---|---|---|
| JP | 2-167808 | 6/1990 |

(Continued)

OTHER PUBLICATIONS

International Search Report of PCT application No. PCT/JP2013/003299 dated Sep. 3, 2013.
(Continued)

*Primary Examiner* — Faye Francis
(74) *Attorney, Agent, or Firm* — Hamre, Schumann, Mueller & Larson, P.C.

(57) ABSTRACT

A dispersion of suspended single-layer graphene, multilayer graphene, and graphite is used. A magnetic field is applied to the dispersion to separate the single-layer graphene from the dispersion. By applying the magnetic field, the single-layer graphene, the multilayer graphene, and the graphite are situated at different locations in solvent by the difference in the diamagnetism strengths of the single-layer graphene, the multilayer graphene, and the graphite.

13 Claims, 7 Drawing Sheets

(51) Int. Cl.
  *C01B 31/04* (2006.01)
  *B82Y 30/00* (2011.01)
  *B82Y 40/00* (2011.01)
  *B02C 19/06* (2006.01)
  *B02C 23/08* (2006.01)
(52) U.S. Cl.
  CPC .............. *B82Y 40/00* (2013.01); *C01B 31/04* (2013.01); *C01B 31/0446* (2013.01); *C01B 31/0469* (2013.01); *B02C 23/00* (2013.01); *B03C 2201/18* (2013.01); *C01B 2204/02* (2013.01)
(58) Field of Classification Search
  USPC ...................................................... 241/29, 21
  See application file for complete search history.

(56) References Cited

U.S. PATENT DOCUMENTS

| | | | |
|---|---|---|---|
| 2011/0130292 A1 | 6/2011 | Kawashima | |
| 2011/0130494 A1 | 6/2011 | Penicaud et al. | |
| 2011/0289924 A1 | 12/2011 | Pietsch | |
| 2012/0043402 A1 | 2/2012 | Lee et al. | |

FOREIGN PATENT DOCUMENTS

| | | |
|---|---|---|
| JP | 2010-535690 | 11/2010 |
| JP | 2011-098843 | 5/2011 |
| JP | 2011-134664 | 7/2011 |
| WO | 2012/134954 | 10/2012 |

OTHER PUBLICATIONS

English Translation of Chinese Search Report dated Oct. 16, 2015 for the related Chinese Patent Application No. 201380028581.3.

The Extended European Search Report dated Jul. 21, 2015 for the related European Patent Application No. 13797064.6.

Eun-Young Choi et al: "Production of graphene by exfoliation of graphite in a volatile organic solvent; Production of graphene by exfoliation of graphite in a volatile organic solvent", Nanotechnology, IOP, Bristol, GB, vol. 22, No. 36, Aug. 11, 2011 (Aug. 11, 2011), p. 365601.

* cited by examiner

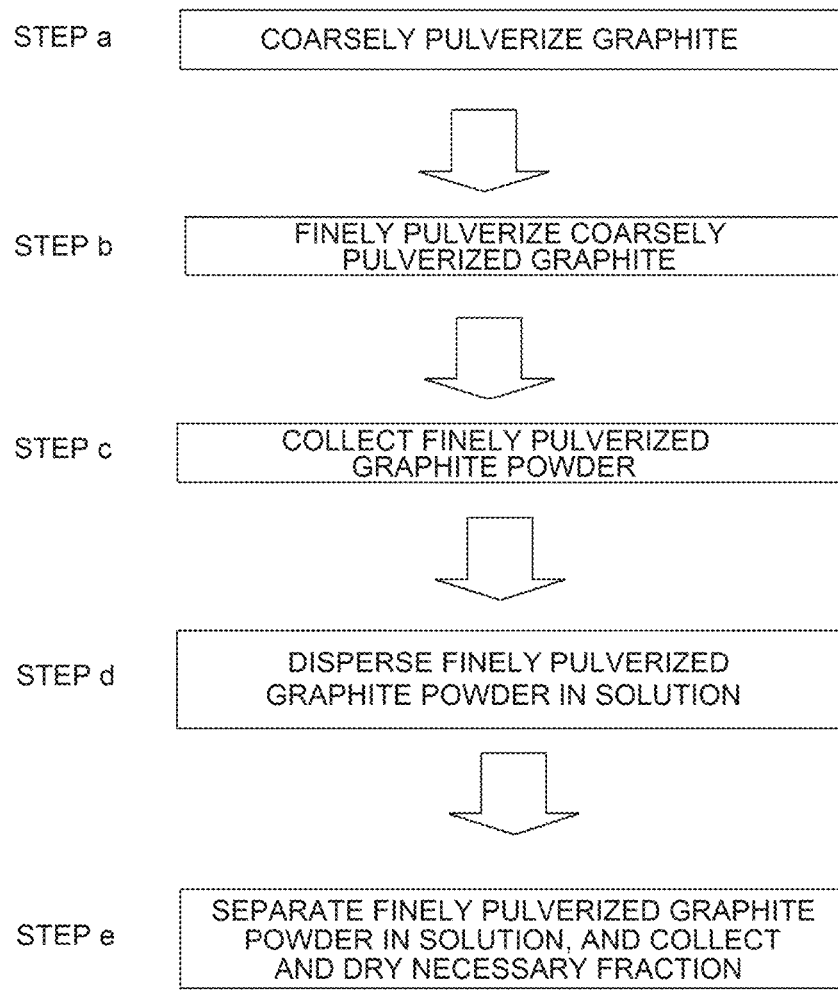

[FIG. 2]
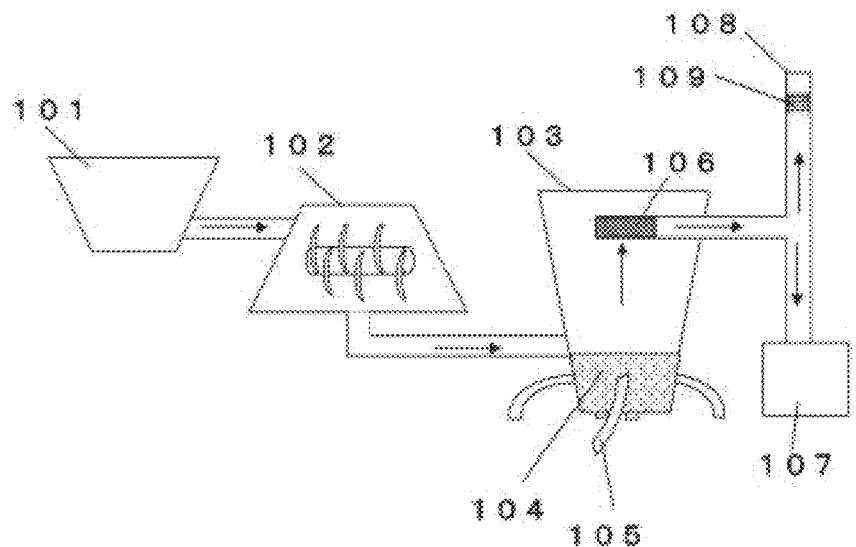
[FIG. 3]
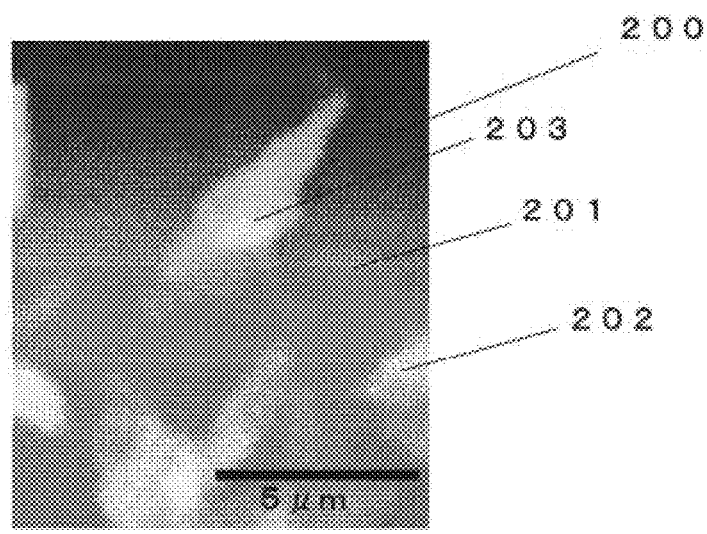
[FIG. 4]
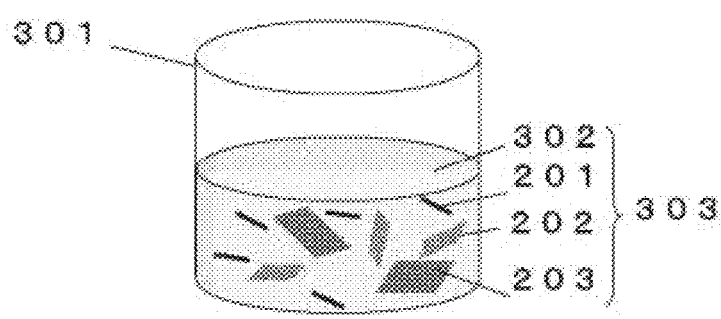

[FIG. 5A]
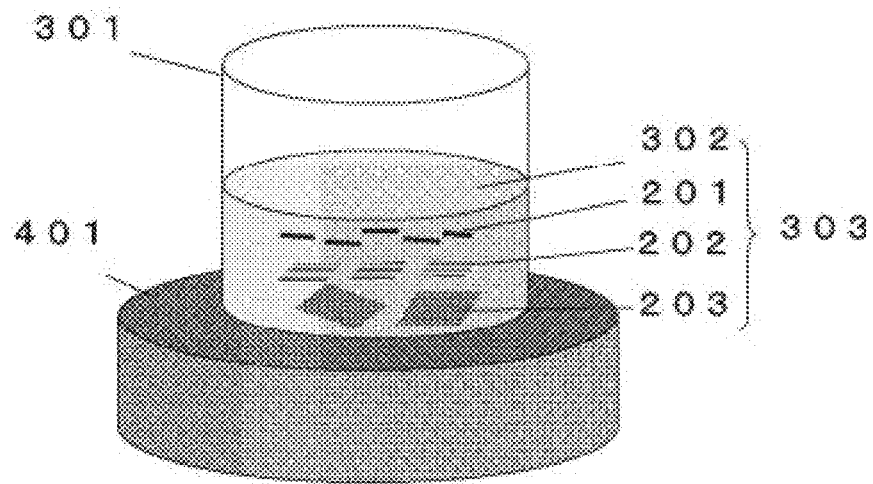
[FIG. 5B]
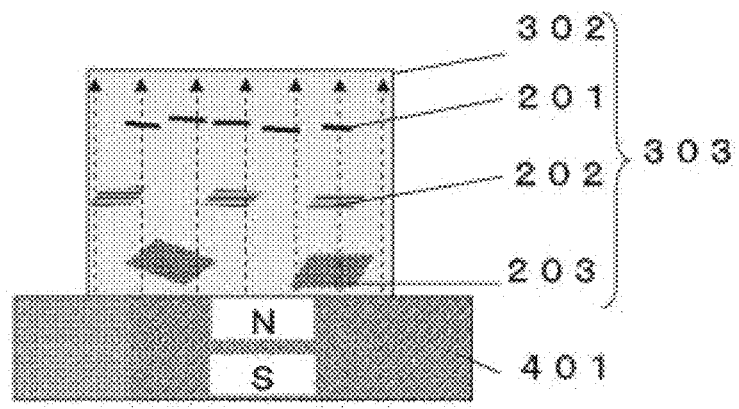

[FIG. 6]
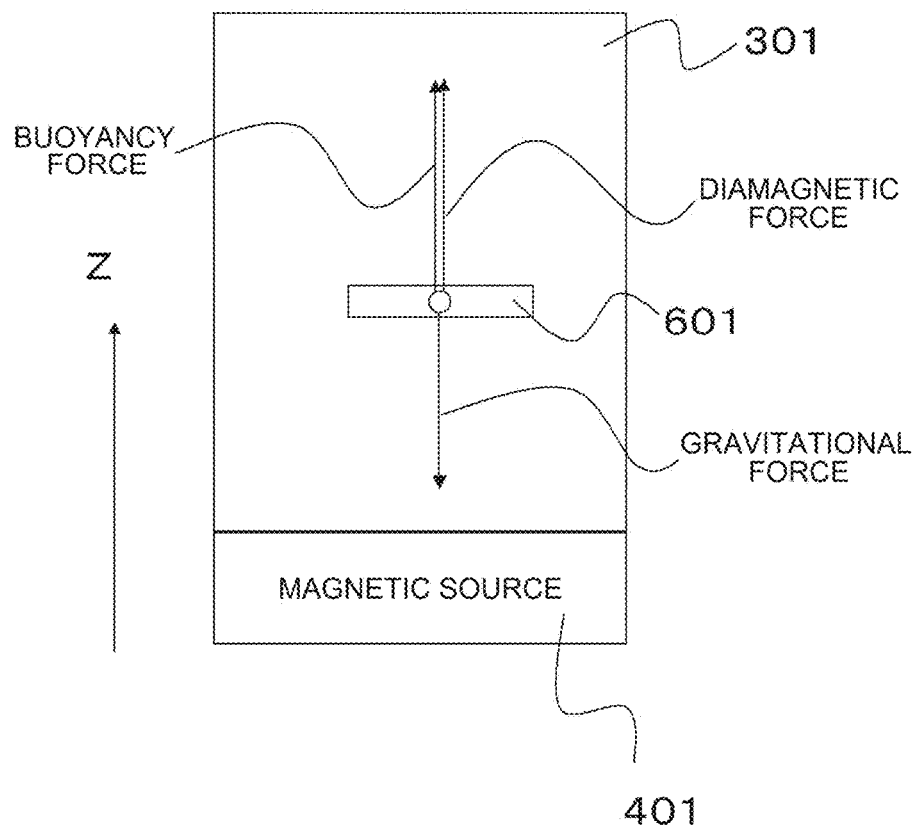
[FIG. 7]
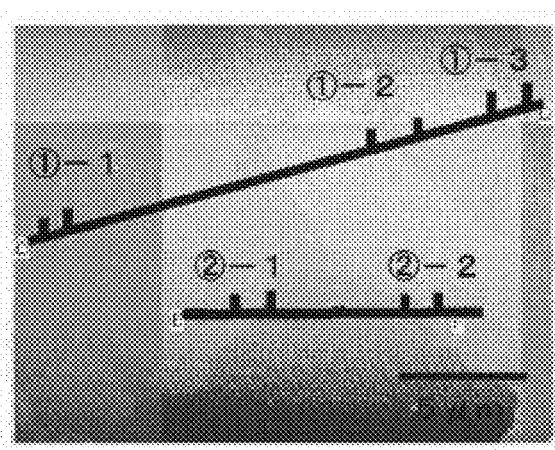

[FIG. 8A]
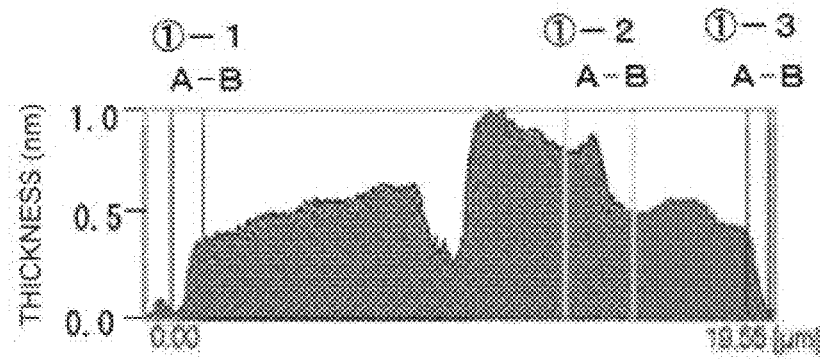
[FIG. 8B]
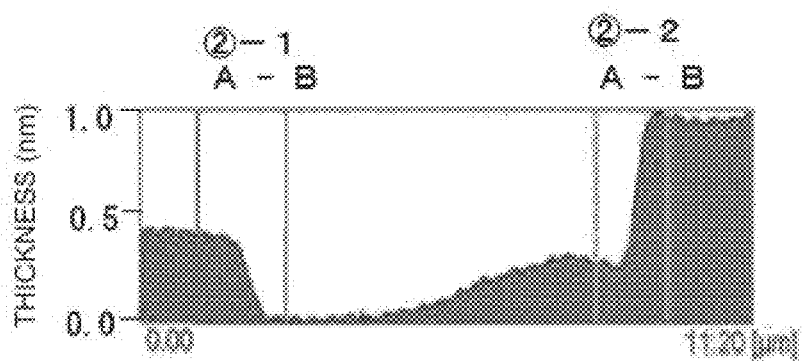
[FIG. 9]
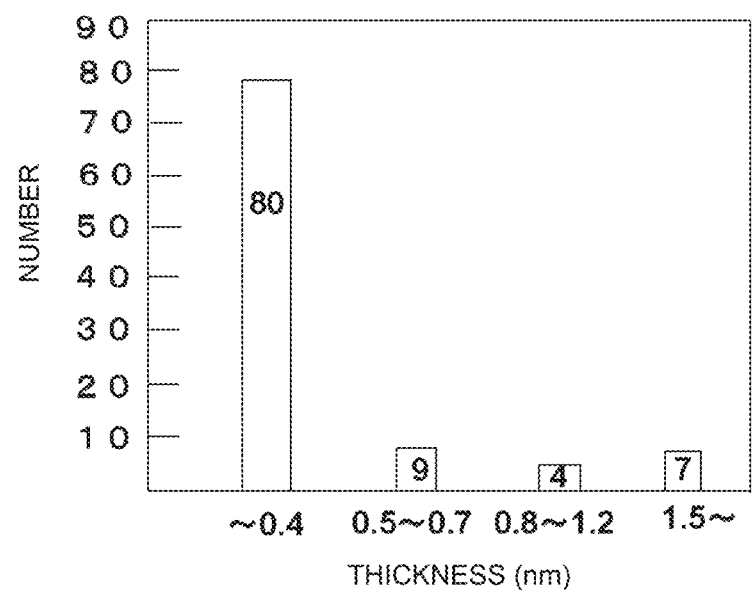

FIG. 10
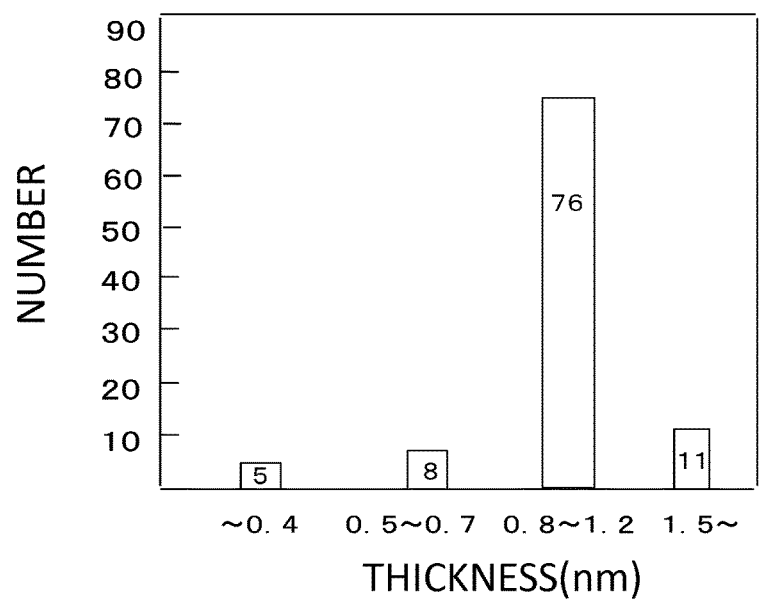
[FIG. 11] PRIOR ART
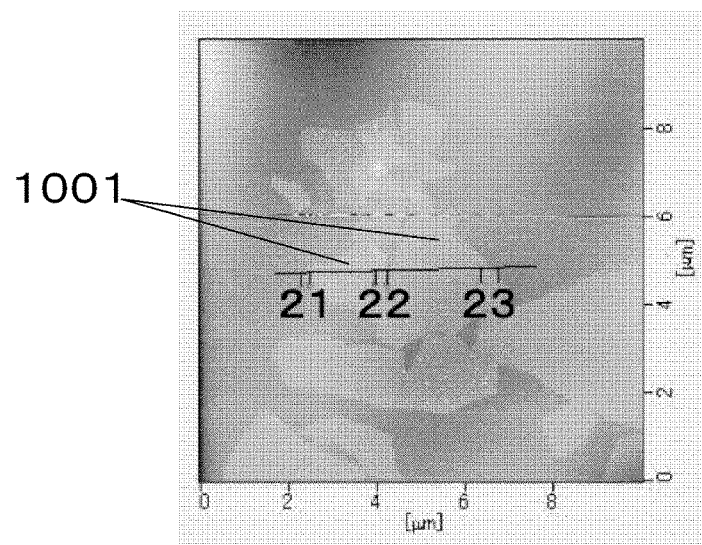

[FIG. 12] PRIOR ART
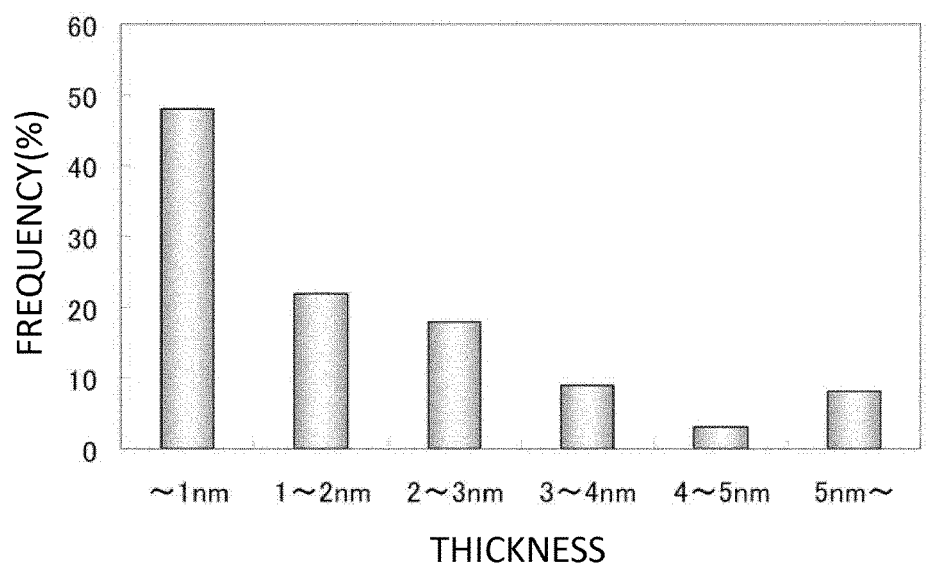

METHOD FOR PRODUCING GRAPHENE

CROSS-REFERENCE TO RELATED APPLICATIONS

The present application is a U.S. national stage application of PCT International Application No. PCT/JP2013/003299 filed on May 24, 2013, and claims the benefit of foreign priority to Japanese patent application 2012-122723 filed on May 30, 2012, the contents all of which are incorporated by reference.

TECHNICAL FIELD

The present invention relates to a graphene producing method applicable to transparent electrodes, battery electrodes, and semiconductor devices.

BACKGROUND ART

Graphene is a material with a single layer of graphite crystals, and has attracted interest as a material with very unique physical properties. Among such unique attractive physical properties of graphene are high electrical mobility, high heat conductivity, high strength, and high light transmissivity. Such unique physical properties should be useful for providing novel electronics devices and nanotechnology materials.

Chemical exfoliation (Patent Literature 1) represents a conventional graphene producing method.

As used herein, the terms "single-layer graphene" and "multilayer graphene" refer to graphite present as a single layer, and graphite present as from 2 to 10 layers, respectively. Graphite having greater numbers of layers will be referred to as "graphite". When stated simply as "graphene", it refers to a state in which the single-layer graphene and the multilayer graphene coexist.

In the chemical exfoliation method, graphite oxide production proceeds by oxidizing a graphite powder with potassium permanganate in concentrated sulfuric acid. The reaction product is then immersed in sulfuric acid, and hydrogen peroxide is added for reaction.

The graphite oxide after the oxidation is irradiated with ultrasonic waves to exfoliate in layer direction.

The exfoliated graphite oxide is dispersed in purified water. The graphite oxide solution is centrifuged, and the supernatant is removed. The supernatant contains single-layer graphene oxide and multilayer graphene oxide.

FIG. 11 represents an SPM image (scanning probe micrograph) of a multilayer graphene oxide obtained by using the conventional producing method described in Patent Literature 1. The graphene oxide 1001 has a thickness of about 0.8 nm at analysis points 21, 22, and 23, and contains multiple (2 to 3) layers of graphene oxide. The graphene oxide 1001 turns itself into a multilayer graphene upon a reduction process performed at 200° C. to 1500° C. for 1 to 48 hours in a reducing atmosphere or a vacuum atmosphere.

FIG. 12 is a diagram representing the thickness and the frequency of randomly selected 100 samples of multilayer graphene oxide obtained by using the conventional producing method described in Patent Literature 1.

About 50% of the multilayer graphene oxides obtained by using the method of Patent Literature 1 have a thickness of 1 nm or less. These oxides appear to include single-layer graphene oxides. However, separation into single-layer graphene, and two- and three-layer graphenes is difficult, and graphenes with the desired number of layers cannot be obtained even after a reduction.

CITATION LIST

Patent Literature

PTL 1: JP-A-2011-98843

SUMMARY OF INVENTION

A problem of the conventional chemical exfoliation method in which a graphite powder is oxidized and exfoliated by ultrasonic waves, and that uses centrifugation for the separation of graphene oxide, then, is that the method cannot separate only the single-layer graphene oxide from a mixture of graphene oxides having different numbers of layers.

As a solution to the foregoing problem, a graphene producing method of the present invention uses a graphene dispersion of suspended single-layer graphene, multilayer graphene, and graphite particles, and the method applies a magnetic field to the dispersion, and separates the single-layer graphene from the dispersion.

The present invention enables separating a single-layer graphene, or graphenes with the desired numbers of layers from a mixed state of graphenes having different numbers of layers.

BRIEF DESCRIPTION OF DRAWINGS

FIG. 1 is a flow chart of the graphene producing method according to an embodiment.

FIG. 2 is a schematic diagram representing the graphite pulverization system of the embodiment.

FIG. 3 shows an SPM image of a mixture of graphenes with different numbers of layers according to the graphene producing method of the embodiment.

FIG. 4 is a schematic perspective view of a dispersion in which the graphite powder produced by using the graphene producing method of the embodiment is dispersed in ethanol.

FIG. 5A is a perspective view showing the state in which a container containing the dispersion is placed on a magnet according to the graphene producing method of the embodiment.

FIG. 5B is a schematic diagram showing a cross section taken in FIG. 5A.

FIG. 6 is a schematic diagram explaining the principle.

FIG. 7 is an SPM image of single-layer graphene on a silicon wafer in a step of the graphene producing method of the embodiment.

FIG. 8A is a diagram representing the data taken in the height analysis performed on line 1 of FIG. 7.

FIG. 8B is a diagram representing the data taken in the height analysis performed on line 2 of FIG. 7.

FIG. 9 is a diagram representing the thickness and the distribution of graphenes in the analysis of randomly selected 100 samples of the single-layer graphene and the multilayer graphene collected from the dispersion 1 cm below the liquid surface according to the graphene producing method of the embodiment.

FIG. 10 is a diagram representing the thickness and the distribution of graphenes in the analysis of randomly selected 100 samples of the single-layer graphene and the multilayer graphene collected from the dispersion 1.5 cm below the liquid surface according to the graphene producing method of the embodiment.

FIG. 11 shows an SPM image of the conventional multilayer graphene oxide described in Patent Literature 1.

FIG. 12 is a diagram analyzing the thickness and the distribution of randomly selected 100 samples of the multilayer graphene oxide obtained according to the conventional producing method of Patent Literature 1.

DESCRIPTION OF EMBODIMENTS

An embodiment of the present invention is described below with reference to the accompanying drawings.
(Graphite)
Graphite is a material with a layered structure, with planar layers of carbon atoms arranged in a hexagonal lattice that resembles the scutes of a turtle and laminated.

Various types of graphite are known, including natural graphite occurring as minerals, thin-film graphite produced by CVD, and high crystallinity graphite produced by high heat treatment of an organic film (crystalline graphite).

High crystallinity graphite shows a (002) peak half bandwidth of 0.1° or less in X-ray diffractometry. It appears that high crystallinity graphite, with its large crystal sizes, tends to break the weak Van der Waals' bonds connecting the layers in the graphite, and helps remove large graphene particles.

It would also appear that use of high crystallinity graphite improves the electrical and thermal properties of graphene because high crystallinity graphite has only a few grain boundaries, which interfere with electron and heat transfer.

In this embodiment, a crystalline graphite obtained by the heat treatment of an organic film in inert gas at about 2500 degrees was used as raw material, and pulverized to produce single-layer graphene.

The crystalline graphite used has a thermal conductivity of 1200 to 1600 W/mK.

Because of high crystallinity, the graphite involves few defects, and the carbon atoms are orderly arranged in a scute pattern. The spins on carbon electrons are thus orderly oriented, and the diamagnetism increases.

Aside from using crystalline graphite, the same results can be obtained with crystalline graphites obtained from natural graphite or by using CVD because the carbon atoms have the same bond energy.

The methods described in, for example, JP-A-8-262199 and JP-A-9-156913 may be used to produce crystalline graphite.
(Producing Process)
The following describes the producing process with reference to FIG. 1.

In step a, crystalline graphite is coarsely pulverized.

The coarse pulverization of the raw material crystalline graphite produces a crystalline graphite powder measuring several millimeters in diameter.

FIG. 2 is a schematic diagram representing the crystalline graphite pulverization system of the embodiment of the present invention.

First, the raw material crystalline graphite is charged into a raw material supply tank 101, and coarsely pulverized with a cutter mill 102 to produce a crystalline graphite powder measuring several millimeters in diameter.

In step b, the crystalline graphite powder obtained in step a is finely pulverized.

The crystalline graphite powder is then supplied into a jet mill 103 (Turboplex ATP; Hosokawa Micron), and finely pulverized into a crystalline graphite under the jet flow generated in a pulverization zone 104 under 0.58-MPa high pressure air supplied through an air hose 105.

In step c, the crystalline graphite powder pulverized in step b is classified, and a fine graphite powder is collected.

Inside the jet mill 103, the generated airflow pushes upward only the fine, light fraction of the pulverized crystalline graphite powder, and only the powder that passed through a classifier 106 rotating at high speed at 20000 RPM is collected into a collection tank 107.

A filter 109 is installed in an air evacuation duct 108, and the fine crystalline graphite powder contained in the evacuated air is collected with the filter 109. Separately, the particle size of the collected crystalline graphite powder was measured with a particle size analyzer (Microtrack MT 3300 EX2, Nikkiso). The particles were several hundred micrometers to several ten micrometers in size.

The powder produced by using the foregoing technique was checked for the presence of any single-layer graphene and multilayer graphene. FIG. 3 shows a photograph obtained by dispersing the powder produced by using the foregoing technique in ethanol, applying the resulting dispersion on a silicon wafer 200, drying ethanol, and the analyzing the surface of the silicon wafer by means of an SPM image. As shown in FIG. 3, the analysis confirmed the presence of a single-layer graphene 201, a multilayer graphene 202, and a graphite 203, measuring 0.3 nm, 10.4 nm, and 560 nm in thickness, respectively. These were several micrometers to several tens of micrometers long as measured on longer side along the plane direction.

An alcohol solvent having good wettability for graphite is used as the solvent. Aqueous solvents have poor wettability for graphite, and require a surfactant.

Solvents such as ethanol, acetone, and IPA also may be used.

After the pulverization with the jet mill 103, the layers of the crystalline graphite can exfoliate and form the single-layer graphene 201 and the multilayer graphene 202. However, the product obtained by the pulverization of the crystalline graphite with the jet mill 103 is a mixture of the single-layer graphene 201, the multilayer graphene 202, and the graphite 203. Instead of using a jet mill, other methods using, for example, a ball mill, or a hammer crusher also may be used.

The following describes the technique for separating the single-layer graphene 201 from the mixed state of the single-layer graphene 201, the multilayer graphene 202, and the graphite 203.

In step d, the fine crystalline graphite powder obtained in step c is dispersed in a solution. The fine crystalline graphite powder is magnetically separated, and the necessary fraction is removed. The solvent is then evaporated to obtain the necessary graphene.

FIG. 4 is a schematic diagram showing a dispersion 303 in which the powder produced by using the technique described in FIG. 2 is dispersed in ethanol 302.

The dispersion 303 was produced as follows. One milligram of the powder produced by using the technique described in FIG. 2 (the mixed powder of the single-layer graphene 201, the multilayer graphene 202, and the graphite 203 confirmed after the pulverization of the crystalline graphite with the jet mill) was weighed, and charged into a container 301 (13.5 ml volume; inner diameter φ20 mm). After adding 10 ml of ethanol 302, the mixture was ultrasonically dispersed for 5 min under 100 W, 28 kHz conditions to disperse the agglomerated graphene and produce the dispersion 303.

FIGS. 5A and 5B are schematic diagrams showing the state in which the container 301 with the dispersion 303 is placed on a magnet 401. FIG. 5A shows the state 15 hours after the container 301 containing the dispersion 303 was placed on the magnet 401.

The magnet 401 is a 1-tesla neodymium magnet with a diameter φ of 25 mm and a thickness of 5 mm. The container 301 containing the dispersion 303 was placed on the magnet 401 for 15 hours. Under applied magnetic field to the mixed solution of the single-layer graphene 201, the multilayer graphene 202, and the graphite 203, these graphenes with different numbers of layers, and the graphite particles separate from each other on the basis of the diamagnetism strength difference.

The principle of this phenomenon is described with reference to FIG. 6. FIG. 6 is a cross sectional schematic diagram representing the relationship between the magnet 401 and a diamagnetic material 601. The container 301 contains a solvent and the diamagnetic material 601.

The magnetic field becomes weaker away from the magnet 401 upwardly along the Z axis. The diamagnetic material 601 is under diamagnetic force, buoyancy force, and the force of gravity.

$$\text{Gravitational force } F = mg \quad \text{(Equation 1)}$$

$$\text{Buoyancy force } U = V\rho \quad \text{(Equation 2)}$$

$$\text{Diamagnetic force } H = \frac{1}{\mu 0} \times \frac{\Delta B}{\Delta z} \times B \times \chi \times V \quad \text{(Equation 3)}$$

In the equations, m is the mass of the diamagnetic material 601, g is the acceleration of gravity, V is the volume of the diamagnetic material 601, ρ is the density of solvent, μ0 is the magnetic permeability in a vacuum, ΔB/Δz represents changes in magnetic field in Z direction, B is the magnetic field, and χ is the magnetic susceptibility.

The material is pushed upward when the sum of the buoyancy force and the diamagnetic force is greater than the gravitational force. Because the magnetic force becomes weaker toward the top, there is a balancing point, provided that the container 301 is sufficiently deep.

Assume here that the diamagnetic material 601 is a combination of the single-layer graphene 201, the multilayer graphene 202, and the graphite 203. These are all carbon compounds with arranged carbon atoms, and have the same density. The volume and mass relationship is the same. The only difference is the magnetic susceptibility χ.

The magnetic susceptibility depends on the numbers of layers in the single-layer graphene 201, the multilayer graphene 202, and the graphite 203. Graphene has a larger magnetic susceptibility per layer because of the jumping effect of electrons between the layers. The magnetic susceptibility is smaller for smaller numbers of layers.

Accordingly, the single-layer graphene 201, with the largest magnetic susceptibility, is on top of the multilayer graphene 202 and the graphite 203 in the solvent, in this order.

(Magnetic Force)

On the relationship between magnetic force and application time, the magnetic force exerted on the graphene decreases exponentially as the magnetic force becomes smaller. Accordingly, the diamagnetic force generated in the graphene becomes smaller, and the separation time increases exponentially with decrease in magnetic force. The separation completes in about 3 hours when the applied magnetic force is increased from 1 tesla to 2 tesla.

The magnetic force needs to be at least 0.05 tesla. Anything below this value results in a graphene mixture with different numbers of layers, and fails to separate the material.

On the other hand, the material cannot be separated when the magnetic force is 5 tesla or more, because, in this case, strong diamagnetic forces generate in the single-layer graphene 201, the multilayer graphene 202, and the graphite 203, and push these materials up towards the liquid surface of the dispersion 303.

However, separation is possible when the container used has a greater depth. Graphenes with the same number of layers situate themselves at substantially the same depth, and can be separated irrespective of the container width, provided that the magnetic force is the same.

The magnetic force thus needs to be 0.05 tesla or more and less than 5 tesla, and is preferably 0.5 tesla to 3 tesla in terms of time and accuracy.

The magnetic susceptibility of the diamagnetism that generates in the single-layer graphene 201, the multilayer graphene 202, and the graphite 203 depends on the number of layers, and the distance from the surface of the magnet 401 differs for different numbers of layers in the suspended graphene.

FIG. 5B is a schematic diagram showing a cross section taken in FIG. 5A. In FIG. 5B, the magnetic field strength of the magnet 401 is indicated by dotted lines with arrowheads. Here, the applied magnetic field to the dispersion 303 is from the N pole of the magnet 401. However, the magnet polarity does not need to be specified because the graphene and the graphite are diamagnetic materials, and generate a magnetic field in opposition, regardless of the polarity of the magnet 401. In the dispersion 303, the single-layer graphene 201 has the highest diamagnetism magnetic susceptibility to the magnetic field, followed by the multilayer graphene 202 and the graphite 203.

Accordingly, the single-layer graphene 201 is the farthest from the surface of the magnet 401, and the multilayer graphene 202 is the second farthest, with the graphite 203 being closest to the magnet 401 near the bottom of the container 301.

Instead of the 1-tesla neodymium magnet used in this embodiment, any other magnet, such as a ferrite magnet, a samarium-cobalt magnet, an alnico magnet, and an electro magnet may be used because the diamagnetism magnetic susceptibility of the graphene and the graphite is determined by the magnetic field. The diamagnetism magnetic susceptibility difference between the single-layer graphene 201 and the multilayer graphene 202 becomes small when the magnetic force is weak. However, separation is possible because these suspended materials travel over different distances in the dispersion.

(Separation of Single-Layer Graphene 201)

The single-layer graphene 201 was obtained by collecting 0.05 ml of the dispersion 303 1 cm below the liquid surface shown in FIG. 5B, using a pipette. This portion of the dispersion 303 was then applied to a silicon wafer, and the ethanol was evaporated to obtain the single-layer graphene 201. FIG. 7 shows a picture of the single-layer graphene 201 on the silicon wafer taken for analysis.

In FIG. 7, the darker areas represent the silicon wafer surface, and the light areas are the single-layer graphene 201. The lightest areas are where the single-layer graphene 201 overlaps. The single-layer graphene 201 was about 10 μmin size in plane direction.

FIGS. 8A and 8B represent the results of the height analysis performed at different points on the lines shown in FIG. 7. FIG. 8A shows the analysis results for line 1 at each vertical line. FIG. 8B shows the analysis results for line 2 at each vertical line. The analysis results are presented in Tables 1 and 2, respectively.

TABLE 1

| Analysis point | Height A (nm) | Height B (nm) | Height difference (nm) |
|---|---|---|---|
| 1-1 | 0.2 | 0.5 | 0.3 |
| 1-2 | 1.1 | 0.8 | 0.3 |
| 1-3 | 0.6 | 0.3 | 0.3 |

TABLE 2

| Analysis point | Height A (nm) | Height B (nm) | Height difference (nm) |
|---|---|---|---|
| 2-1 | 1.0 | 0.7 | 0.3 |
| 2-2 | 0.9 | 1.3 | 0.7 |

The graphene thickness difference was 0.3 nm for 1-1, 1-2, 1-3, and 2-1 as measured by SPM. The thickness falls within the thickness range of single-layer graphene, and the results suggest that the single-layer graphenes are present on top of each other.

The height difference was 0.7 nm for 2-2, suggesting that there is an overlap of the single-layer graphenes.

FIG. 9 is a diagram representing the thickness and the number of graphenes in the analysis of randomly selected 100 samples of the single-layer graphene 201 and the multilayer graphene 202 obtained in the same manner as in FIG. 7. Specifically, the single-layer graphene 201 and the multilayer graphene 202 were obtained by collecting 0.05 ml of the dispersion 303 1 cm below the liquid surface of the dispersion 303 of FIG. 5B using a pipette, and applying the dispersion 303 to a silicon wafer and evaporating the ethanol.

The SPM measurement revealed that 80% of the graphenes were single-layer graphenes, showing that the single-layer graphene 201 was collected in high purity.

(Separation of Multilayer Graphene 202)

The following describes the technique for separating the multilayer graphene 202 from the mixed state of the single-layer graphene 201, the multilayer graphene 202, and the graphite 203.

The multilayer graphene 202 has weaker diamagnetism magnetic susceptibility than the single-layer graphene 201, and concentrates more toward the magnet 401 than the single-layer graphene. The multilayer graphene 202 was thus obtained by collecting 0.05 ml of the dispersion 303 1.5 cm below the surface of the dispersion 303, and applying this fraction to a silicon wafer and evaporating the ethanol 302.

FIG. 10 is a diagram representing the thickness and the number of graphene in the analysis of randomly selected 100 samples of the single-layer graphene and the multilayer graphene that remained on the silicon wafer after the dispersion 303 collected 1.5 cm below the liquid surface was applied and dried on the silicon wafer.

The percentage of three-layer graphenes with a thickness of 1.0 nm was found to be 76% by the measurement performed in the same manner as above after collecting ethanol at a 1.5-cm distance from the magnet 401.

As can be seen from the results presented in FIGS. 9 and 10, there is a depth distribution, with the lighter single-layer graphene distributed more toward the surface than the thicker and heavier graphene. Specifically, the single-layer graphene is in areas of a weaker magnetic field, away from the magnetic field, whereas the multilayer graphene is in areas of a stronger magnetic field, closer to the magnetic field.

By creating such a distribution beforehand by taking measurements under fixed conditions, it would be possible to find and remove a graphene of the desired number of layers. As is evident, the graphene may be removed after performing an analysis.

As demonstrated above, graphene can be separated on the basis of the number of layers by taking advantage of the differences in the magnetic susceptibility of the graphenes of different numbers of layers in a magnetic field. The distribution depends on the number of layers, and a graphene with the desired number of layers can be removed regardless of the size.

In the technique described above, a magnetic field is applied from below the container 301 to vertically distribute the graphenes, and the desired materials can be removed with the solvent from different levels in the depth direction. Any foreign objects can be separated from graphenes because any such objects settle or float on the basis of their densities relative to the solvent.

In this case, the influence of gravity is negligible because the diamagnetism is strong enough, and the number of layers is small.

It is also possible in the foregoing embodiment to separate the single-layer graphene and the multilayer graphene as a group from the graphite. Separation of the single-layer graphene from other graphenes is also possible. Graphenes can be separated by the number of layers.

INDUSTRIAL APPLICABILITY

The graphene producing method of the present invention enables separating single-layer graphene and multilayer graphene in high purity to obtain a graphene of the desired number of layers. The invention also has use in semiconductor device and transparent electrode applications, such as in electronics devices and nanotechnology materials.

REFERENCE SIGNS LIST 21, 22, 23 Analysis point
101 Raw material supply tank
102 Cutter mill
103 Jet mill
104 Pulverization zone
105 Air hose
106 Classifier
107 Collection tank
108 Evacuation duct
109 Filter
200 Silicon wafer
201 Single-layer graphene
202 Multilayer graphene
203 Graphite
301 Container
302 Ethanol
303 Dispersion
401 Magnet
601 Diamagnetic material
1001 Graphene oxide

The invention claimed is:

1. A method for producing graphene, the method comprising:
applying a magnetic field using magnet to a dispersion comprising graphene, graphite, and a solvent, in a container, and locating the graphene and the graphite at different locations in the dispersion from each other; and
separating the graphene from the dispersion comprising the graphite by removing the graphene with the solvent from the dispersion,
wherein the graphene comprises single-layer graphene and multilayer graphene having in a range from two to 10 graphite layers, and the graphite is graphite having 11 or more graphite layers.

2. The method for producing graphene according to claim 1,
wherein the applying the magnetic field is performed by using a difference in diamagnetism strengths between the graphene and the graphite.

3. The method for producing graphene according to claim 1,
wherein, by the applying the magnetic field, the graphene is located in a region in the dispersion where the magnetic field is weak, and the graphite is located in a region in the dispersion where the magnetic field is strong.

4. The method for producing graphene according to claim 1,
wherein the applying the magnetic field is performed by applying the magnetic field from underneath of the container and distributing the graphite and the graphene vertically in this order from a bottom to a top of the container.

5. The method for producing graphene according to claim 1,
wherein a location of the graphene to be removed with the solvent in the separating the graphene is determined by strength of the magnetic field applied in the applying the magnetic field and buoyant force of the graphene used therein.

6. The method for producing graphene according to claim 1,
wherein the magnetic field applied in the applying thereof has magnetic force in a range of 0.05 tesla or more and less than 5tesla.

7. The method for producing graphene according to claim 1,
wherein the graphene and the graphite have been produced by pulverizing primary graphite.

8. The method for producing graphene according to claim 7,
wherein the pulverizing the primary graphite comprises: primary pulverizing so as to form a coarse powder of the primary graphite; and further secondary pulverizing the coarse powder into a fine powder of the primary graphite.

9. The method for producing graphene according to claim 8,
wherein the primary pulverizing is performed with a jet mill.

10. The method for producing graphene according to claim 7, further comprising fractionating a powder of the pulverized primary graphite in an airflow so as to obtain the graphene and the graphite.

11. The method for producing graphene according to claim 1,
wherein in the applying of the magnetic field, the magnetic field is applied from underneath the container, and the graphene and the graphite are located at vertically different locations in the dispersion from each other.

12. The method for producing graphene according to claim 11,
wherein by the applying of the magnetic field using magnet to the dispersion, the graphene is located where gravity of the graphene, buoyant force of the graphene, and strength of the magnetic field are balanced, and is located at a different location from a location of the graphite, where gravity of the graphite, buoyant force of the graphite, and the strength of the magnetic field are balanced.

13. A method for producing graphene, the method comprising:
applying a magnetic field using magnet to a dispersion comprising: (i) a combination of single-layer graphene and multilayer graphene having in a range from two to 10 graphite layers; (ii) graphite having 11 or more graphite layers; and (iii) a solvent, in a container, and locating the single-layer graphene, the multilayer graphene, and the graphite at different locations in the dispersion from each other; and
separating at least one material selected from the group consisting of the single-layer graphene and the multilayer graphene, from the dispersion comprising the graphite by removing the at least one material with the solvent from the dispersion.

* * * * *